July 21, 1970  P. FINKELSTEIN ETAL  3,521,489
DISPOSABLE THERMOMETER
Filed Jan. 22, 1968  2 Sheets-Sheet 1
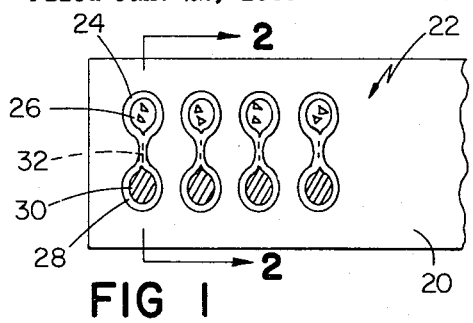
FIG 1
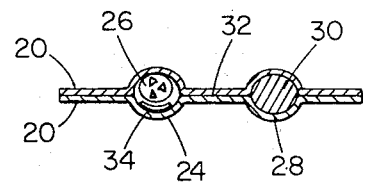
FIG 2
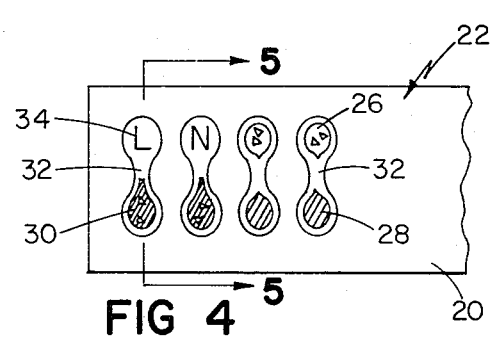
FIG 3
FIG 4
FIG 5
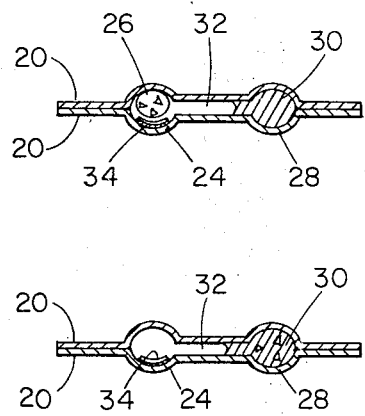
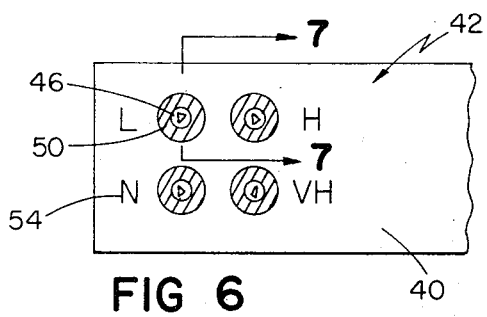
FIG 6
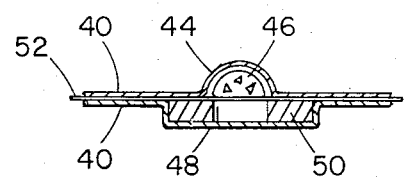
FIG 7
FIG 8
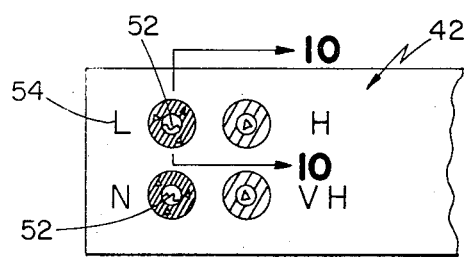
FIG 9
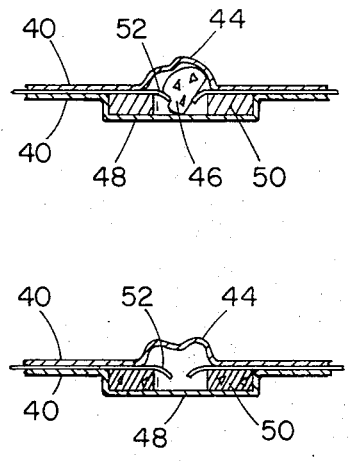
FIG 10

July 21, 1970     P. FINKELSTEIN ETAL     3,521,489
DISPOSABLE THERMOMETER
Filed Jan. 22, 1968
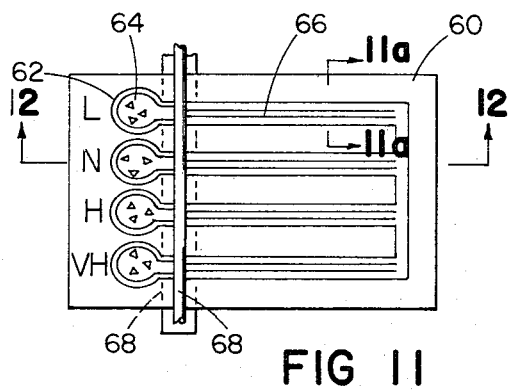
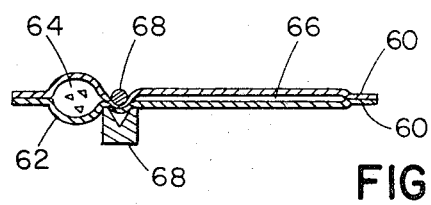
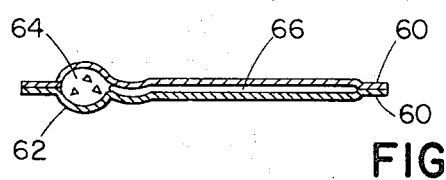
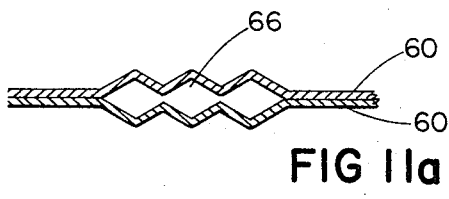
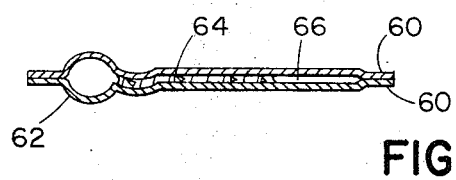
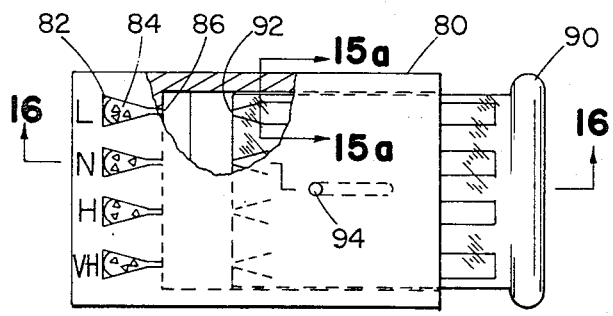
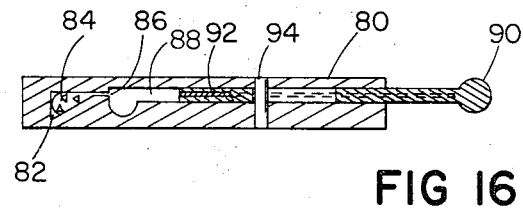
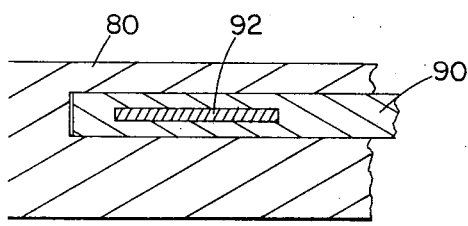
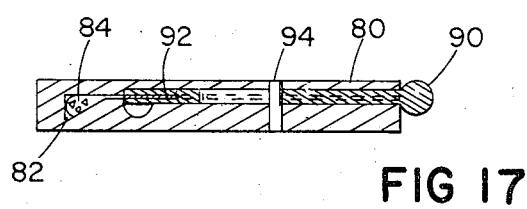
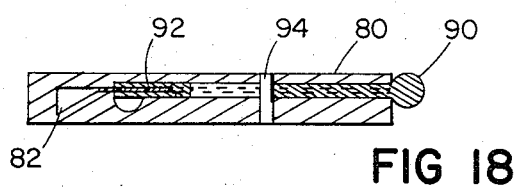

United States Patent Office 3,521,489
Patented July 21, 1970

3,521,489
DISPOSABLE THERMOMETER
Paul Finkelstein, Karl Laden, and James L. Solan, Silver Spring, Md., assignors to The Gillette Company, Boston, Mass., a corporation of Delaware
Filed Jan. 22, 1968, Ser. No. 699,387
Int. Cl. G01k 11/06
U.S. Cl. 73—358                              4 Claims

ABSTRACT OF THE DISCLOSURE

An irreversible and disposable thermometer containing a supply of solid material melting at a selected temperature, and a receiver such as a capillary tube or an absorbent material which causes the material to flow irreversibly when in contact with it in molten form, the material being maintained out of contact with the receiver until the thermometer has been activated, the flow of the material providing visible evidence that melting has occurred.

---

This invention relates to single use thermometers, particularly clinical thermometers.

While the ordinary mercury-in-glass clinical fever thermometer for determing approximate body temperature is generally satisfactory, in many cases a thermometer which will respond more quickly than the conventional thermometer is useful, as for example, in pediatrics or similar situations where it is difficult or inconvenient to keep a thermometer in place for several minutes. Furthermore, while the mercury in glass thermometer is capable of indicating the maximum temperature and holding that reading it cannot be used for recording such important data as overnight fever peaks because of the dangers of the glass tube breaking.

Alternative inexpensive irreversible thermometers that can be used only once ordinarily suffer from the difficulty that if they are exposed before use to a temperature higher than the one they are intended to indicate, as, for example, in storage or during shipment, they are rendered useless.

After use, such an irreversible thermometer must be disposed of. This disposability may be turned to an advantage and the thermometer may be useful even when irreversibility is not required. The thermometer can be manufactured inexpensively. Because sterilization of a used thermometer is inconvenient and sometimes, in the home, inadequately carried out, a cheap disposable thermometer purchased by the consumer in a sterilized package assures its use in a sterilized condition.

The objects of this invention are, therefore, to provide an inexpensive, easily manufactured thermometer which will respond more quickly than conventional thermometers; which will function irreversibly so that once sensed, the temperature indicated remains readily identifiable for an extended duration; and which will tolerate storage at moderately elevated temperatures (above 49° C. (120° F.)) prior to use without altering its appearance, sensitivity or precision.

The invention features temperature sensing based on the characteristic melting point of selected materials; temperature indication based on a flow of melted material from some holding compartment into a flow-inducing receiving element, which may be an absorbent material of fibrous, granular or solid nature, or the interfacial capillary region between two solid surfaces; and separation to isolate the temperature sensitive material from the receiving element until deliberate communication is established at the time of use. It is believed that flow induced by absorbent material occurs by capillary action as well as flow induced by a capillary tube.

Other objects, features and advantages will appear from the following description of preferred embodiments of the invention, taken together with the attached drawing thereof, in which:

FIG. 1 shows a first embodiment of the invention for measuring body temperature with a separable seal barrier between the temperature sensitive agents and the absorbent media, as supplied to the user;

FIG. 2 is a cross-section view of the first embodiment along the line 2—2 of FIG. 1;

FIG. 3 is a cross-section view of the first embodiment after the seal has been broken and before use;

FIG. 4 shows the first embodiment after use;

FIG. 5 is a cross-section view of the first embodiment along the line 5—5 of FIG. 4;

FIG. 6 shows a second embodiment of the invention with a frangible film barrier between the temperature sensitive agents and the absorbent media, as supplied to the user;

FIG. 7 is a cross-section view of the second embodiment along the line of 7—7 of FIG. 6;

FIG. 8 is a cross-section view of the second embodiment after the film has been broken and before use;

FIG. 9 shows the second embodiment after use;

FIG. 10 is a cross-section view of the second embodiment along the line 10—10 of FIG. 9;

FIG. 11 shows a third embodiment of the invention with an interrupted capillary barrier between meltable solids and absorbent media as supplied to the user;

FIG. 11a is an enlarged cross-section view of the capillary passage of the third embodiment, along the line 11a—11a of FIG. 11;

FIG. 12 is a cross-section view of the third embodiment along the line 12—12 of FIG. 11;

FIG. 13 is a cross-section view of the third embodiment after the capillary passage has been opened and before use;

FIG. 14 is a cross-section view of the third embodiment after use;

FIG. 15 is a top view, partially cut away, of a fourth embodiment as supplied to the user;

FIG. 15a is an enlarged cross-section view of the absorbent material compartment of the fourth embodiment, along the line 15a—15a of FIG. 15;

FIG. 16 is a cross-section view of the fourth embodiment along the line 16—16 of FIG. 15;

FIG. 17 is a cross-section view of the fourth embodiment after the capillary gap has been closed and before use; and FIG. 18 is a cross-section view of the fourth embodiment after use.

FIGS. 1 to 5 show a single use, irreversibly indicating clinical thermometer of the separable seal barrier type.

FIGS. 1 and 2 show the thermometer as it is supplied to the user. Two sheets 20 of transparent, synthetic plastic, resilient material are bonded together, forming a basic support layer 22 and also forming bubbles which form pairs of compartments, one compartment 24 holding an opaque temperature sensitive material 26 and the other compartment 28 containing a receiving absorbent 30 of cotton batting, and passages 32 between the compartments of a pair. The envelope thus formed is of a material to insure against contaminating the critical composition of the temperature sensitive agents as well as to isolate them from contact with body tissues. Any of a wide variety of conventional synthetic plastic compositions may be used for this purpose, including polyolefins such as polyethylene, polypropylene, etc., polyvinyl resins such as polyvinyl chloride or acetate, polyvinyl butyral, polyacrylates, etc., the choice of plastic composition in any particular case depending inter alia upon the identity of the particular temperature sensitive agents which are present.

The resilient walls of the passage 32 are sealed together at one point in the passage. The seal can be made by any of the conventional film sealing techniques (e.g. heat, ultrasonic, solvent techniques). The seal is considerably weaker than that which bonds sheets 20 together to form basic support layer 22. The seal may be ruptured by flexing the thermometer. In the configuration of FIGS. 1 and 2, the thermometer will not indicate temperature. Exposure to elevated temperature will cause the materials 26 to melt, but since the melting action is reversible and the melted materials cannot flow away (passage 32 is sealed), they will resume their original solidity in the same compartments 24 upon subsequent cooling.

Letters 34 (N, L, H and VH) are inscribed at the bottoms of compartments 24 containing the temperature sensitive materials 26. Each letter represents the usual qualitative statement (normal, low, high and very high, respectively) corresponding to the body temperature at which the solid 26 in the compartment 24 melts. When the opaque materials 26 are present in compartments 24, the letters are not visible.

A partial list of suitable temperature sensing materials and their melting points is as follows.

| Compound: | M.P., °C. |
|---|---|
| 6-bromohexanoic acid | 34–36 |
| Dicyclohexyl adipate | 34–36 |
| Ethylene carbonate | 35–37 |
| 2-ethoxynaphthalene | 36.0–37.0 |
| 2-nitrobiphenyl | 36.6–38.1 |
| p-Diethylaminobenzaldehyde | 37.0–37.5 |
| 2,5-di-iso-propyl-p-xylene | 37–38 |
| Dimethyl itaconate | 37.0–39.2 |
| 3-nitro-2,6-lutidine | 37.1–38.6 |
| 1-iodo-3-nitrobenzene | 37.5–38.0 |
| 1-tetradecanol | 38.0–38.4 |
| p-Nitrophenyl trifluoroacetate | 38–40 |
| 2-bromo-3-methoxybutyric acid | 39.0–40.0 |
| Trilaurin | 39–41 |
| Ethyl-m-nitrobenzoate | 39.5–40.0 |
| Methyl stearate | 39.5–40.0 |
| 1,2-dichloro-4-nitrobenzene | 40.5–41.0 |
| Dimethyl tetradecanedioate | 41–43 |
| 5-methyl-2-pyrollidone | 41–43 |
| Tridecanoic acid | 41.6–42.9 |
| 3,4-dimethoxybenzaldehyde | 42–45 |

Other materials having other ranges of melting points for other measuring purposes will be apparent to one skilled in the art. If only the attainment of a single temperture need be tested, only one material need be selected and only one indicator will be necessary.

The absorbent material employed in the invention may be of fibrous, granular or massive nature. Among the fibrous materials are absorbent cellulosic papers (such as blotting, tissue or filter paper or crepe wadding), absorbent non-woven fabrics (such as felt or batting), or absorbent woven or knitted fabrics (such as diaper fabric or toweling). The fabrics may contain cotton, wool, rayon, nylon, polyester or acrylic fibers, yarns or threads, which may be treated with an appropriate resin to increase absorption if desired. Among the granular materials that may be used are diatomaceous earth, fuller's earth, silicic acid, alumina, charcoal and vermiculite. These materials may be used alone or with a binder (such as calcium sulfate) to impart rigidity. Solid absorbents that may be used include sintered glass and sponge made of various synthetic plastics.

To activate the thermometer, the sealed passages 32 are unsealed by flexing the thermometer and flow paths are thereby opened to permit flow of melted materials into the receiving absorbents from compartments 24 to compartments 28 (see FIG. 3).

When the therometer is suitably placed so that body heat is applied to it, all of the temperature sensitive materials 26 with melting points below the body temperature will melt; those with melting points above will not. The melted materials 26 will then flow into the absorbents 30 (see FIGS. 4 and 5). The absence of melted materials 26 from the holding compartments that are emptied will allow the letters 34 to become visible and the maximum teperature sensed will be thereby indicated.

FIGS. 6 to 10 show a single use, irreversibly indicating clinical thermometer of the frangible film barrier type, also for measuring body temperature.

FIGS. 6 and 7 show the thermometer as it is supplied to the user. In this embodiment the two sheets 40 which are pressed together form the basic layer 42 with one sheet forming resilient bubbles to become compartments 44 for holding temperature sensitive materials 46, each of which melts at a different temperature, and the other sheet forming bubbles to become compartments 48 for receiving absorbents 50 arranged in annular shapes. The absorbent material in this case is diatomaceous earth with calcium sulfate binder. A thin transparent breakable film 52 anchored between the sheets 40 at its edges separates and isolates the materials and absorbents in adjacent compartments from each other whether the temperature sensitive material is melted or not. Letters 54 are printed outside the compartments on the base layer 42 and adjacent the proper corresponding compartment (see FIG. 6).

To activate the thermometer, pressure is created on each compartment 44 to cause the material 46 in solid form in it to break the film 52. The hole at the center of each annularly shaped absorbent 50 facilities the film rupture by allowing the solid 46 to pass through. The activating operation may be carried out by passing the thermometers between pressure rollers to displace the solid materials 46 and rupture film 52.

When the thermometer is used, the temperature sensitive materials 46, upon melting, will be wicked into the adjacent absorbents 50. The disappearance of the temperature sensitive material from the center of the annular absorbent indicates melting and the adjacent letter indicates the temperature which has been reached.

FIGS. 11 to 14 show a single use, irreversibly indicating clinical thermometer of the interrupted capillary barrier type. In this form of the embodiment the capillary passages are closed to prevent indication during storage.

FIGS. 11 and 12 show the thermometer as supplied. The two sheets of resilient material 60 that are pressed together form bubbles as compartments 62 for holding temperature sensitive materials 64, and then, leading from them, sets of parallel tubes 66 which act as capillary tubes for receiving the materials when they are melted. An identifying letter, serving the same purpose as in the other embodiments, is found adjacent each set of tubes 66. As supplied, a clamp 68 holds together the walls of tubes 66 closed to the temperature sensitive material compartments 62. If any of the materials melt before the clamp is removed, passage up the tubes by the melted material is impossible.

To activate the thermometer, the clamp 68 is removed and the walls of the tubes 66 spring apart (see FIG. 13). When used, the melted materials 64 move up the receiving capillary path 66 (see FIG. 14). This movement will be apparent through the transparent sheets 60 and indicate the highest temperature reached.

FIGS. 15 to 18 show a single use, irreversibly indicating clinical thermometer of the interrupted capillary barrier type. In this embodiment a capillarity gap is created to avoid premature indication during storage.

FIGS. 15 and 16 show the thermometer as supplied. Rather than being sheets, the transparent material is in the shape of a block 80. Within the block at one end are the compartments 82 for holding the temperature sensitive materials 84. The compartments 82 are in the shape of three-sided pyramids, with the narrowest point opening into a cavity, or gap 86. The gap 86 is in communication with a channel 88 in which member 90 slides. Member 90 includes four long compartments 92 containing absorbent material, in the form of strips of blotting paper. The compartments 92 are open at the end of the member 90 facing compartments 82. A stop pin 94 anchored to the block 80 limits the movement of the construction 90 away from compartments 82. In this position if the temperature sensitive materials 84 melt, they remain within compartments 82 due to liquid surface tension. The gap 86 prevents movement by capillary action out of the compartments so that the absorbent materials in compartments 92 of member 90 are isolated.

The thermometer is activated when the member 90 is pushed in, by-passing the gap 86 and linking the small opening of the temperature sensitive material compartments 82 to the absorbent materials in compartments 92 of member 90 so that the compartments are in effective communication with the flow-inducing absorbent materials.

When the thermometer is used, indication occurs by the change in appearance due to the absorption of the melted materials by the strips of blotting paper.

Other embodiments will be obvious to those skilled in the art and are within the following claims:

What is claimed is:
1. An irreversible and disposable thermometer comprising
   a supply of material in solid form adapted to melt reversibly at a selected temperature to form a fluid,
   a compartment for holding said supply of materials in both solid and fluid form in position to be heated to a temperature at least as high as said selected temperature,
   means adapted to induce flow of fluid material from said compartment when in communication therewith,
   releasable means for isolating said flow inducing means from said compartment comprising a member for movably supporting said flow-inducing means,
   said member being mounted for movement from and to positions in which said compartment and said flow-inducing means are respectively (1) spaced apart and isolated from each other, and (2) in communication with each other,
   said compartment and flow-inducing means including means for indicating that flow of fluid material has occurred.

2. A thermometer as claimed in claim 1 in which said flow-inducing means is constructed and arranged to cause said molten material to flow from said position independently of gravity.

3. A thermometer as claimed in claim 2 in which said movement is sliding movement and said flow occurs by capilliary action when taking temperature measurements.

4. A thermometer as claimed in claim 1 in which said movement is sliding movement and said flow occurs by capillary action when taking temperature measurements.

References Cited
UNITED STATES PATENTS

| | | |
|---|---|---|
| 2,460,215 | 1/1949 | Chase. |
| 3,420,205 | 1/1969 | Morison _____ 252—408 X |
| 2,614,430 | 10/1952 | Ballard et al. ____ 116—114.5 X |
| 2,744,624 | 5/1956 | Hoogstoel et al. |
| 2,906,327 | 9/1959 | Crumley et al. _____ 220—27 X |
| 2,945,305 | 7/1960 | Strickler _____ 73—356 X |
| 2,966,261 | 12/1960 | Bradbury _____ 73—356 X |
| 3,036,894 | 5/1962 | Forestiere. |
| 3,192,091 | 6/1965 | Hey et al. _____ 156—344 X |
| 3,335,901 | 8/1967 | Edwards _____ 220—27 X |
| 3,366,226 | 1/1968 | Baklor _____ 220—16.5 |

S. CLEMENT SWISHER, Primary Examiner

D. M. YASICH, Assistant Examiner

U.S. Cl. X.R.
252—408